(12) United States Patent
Chen

(10) Patent No.: US 7,097,023 B1
(45) Date of Patent: *Aug. 29, 2006

(54) FINISHED PRODUCT RECEIVING UNIT OF A CORRUGATED METAL SHEET MEMBER MAKING MACHINE

(76) Inventor: Chun-Liang Chen, 2F., No.20-1, Ting-Tien-Liao, Tamshui Town, Taipei Hsien (TW)

( * ) Notice: Subject to any disclaimer, the term of this patent is extended or adjusted under 35 U.S.C. 154(b) by 105 days.

This patent is subject to a terminal disclaimer.

(21) Appl. No.: 10/902,027

(22) Filed: Jul. 30, 2004

(51) Int. Cl.
*B65G 29/00* (2006.01)

(52) U.S. Cl. ............. 198/466.1; 198/607; 198/468.9; 198/468.11

(58) Field of Classification Search ............ 198/817, 198/604, 605, 607, 466.1, 468.6, 469.9, 468.11
See application file for complete search history.

(56) References Cited

U.S. PATENT DOCUMENTS

| | | | | |
|---|---|---|---|---|
| 4,573,862 A | * | 3/1986 | Anderson ............ | 198/750.11 |
| 4,639,180 A | * | 1/1987 | Cucchi et al. ......... | 414/224.01 |
| 5,368,643 A | * | 11/1994 | Kuster ................... | 118/324 |
| 5,638,665 A | * | 6/1997 | Muller .................. | 53/543 |
| 5,711,412 A | * | 1/1998 | Gysin et al. ............. | 198/732 |
| 6,082,526 A | * | 7/2000 | Baker et al. ............. | 198/817 |
| 6,220,424 B1 | * | 4/2001 | Fluck ................... | 198/468.6 |
| 6,253,907 B1 | * | 7/2001 | Lachmann et al. .... | 198/750.14 |
| 6,378,198 B1 | * | 4/2002 | Asai et al. ............... | 29/825 |

* cited by examiner

*Primary Examiner*—Gene O. Crawford
*Assistant Examiner*—Rashmi Sharma
(74) *Attorney, Agent, or Firm*—Troxell Law Office, PLLC

(57) ABSTRACT

A finished product receiving unit used in a corrugated metal sheet member making machine for receiving finished products is disclosed to include a rack, rollers arranged in the rack for receiving finished products, two drag rods longitudinally arranged in parallel, links respectively coupled between the drag rods and the rollers, and two air cylinders controlled to move the drag rods and to further shift the rollers between the transverse direction to receive finished products and the longitudinal direction to let received finished products fall to the collection place at the bottom side of the rack.

2 Claims, 5 Drawing Sheets

FINISHED PRODUCT RECEIVING UNIT OF A CORRUGATED METAL SHEET MEMBER MAKING MACHINE

BACKGROUND AND SUMMARY OF THE INVENTION

The present invention relates to a corrugated metal sheet member making machine and more particularly, to a finished product receiving unit used in a corrugated metal sheet member making machine.

FIG. 1 shows a conventional corrugated metal sheet member making machine 10 for making corrugated metal sheets or metal tiles During operation of this structure of corrugated metal sheet member making machine 10, metal sheet material 100 is delivered from a material feeder 101 to a roller ramming unit 102 and roller-rammed into a corrugated form by the roller ramming unit 102, and then the corrugated metal sheet material is properly cut by a cutting unit 103 into corrugated metal sheet members subject to the desired size, and then the finished products are delivered one after another to a finished product receiving rack 105 by a conveyer 104. The finished product receiving rack 105 has a certain length. Workers are standing at two sides of the finished product receiving rack 105 to pick up and pack finished products. This manufacturing line requires much longitudinal installation space. Further, this design of corrugated metal sheet member making machine requires much labor and time to pick up and pack finished products.

The present invention has been accomplished under the circumstances in view. It is therefore the main object of the present invention to provide a finished product receiving unit for use in a corrugated sheet member making machine, which saves much labor and time in finished products collection.

To achieve this and other objects of the present invention, the finished product receiving unit is used in a corrugated metal sheet member making machine for receiving finished corrugated metal sheet members, comprising: an elongated rack extended in longitudinal direction; a plurality of rollers symmetrically bilaterally arranged along the length of the elongated rack; two drag rods longitudinally arranged in parallel inside the elongated rack; a plurality of links symmetrically arranged at two sides inside the elongated rack corresponding to the rollers, the links each having a first end coupled to one end of one of the rollers and a second end coupled to one of the drag rods; and two air cylinders bilaterally installed in the elongated rack and adapted to move the drag rods longitudinally between a first position where the links are forced to move the rollers to a transverse direction for supporting finished corrugated metal sheet members received from the corrugated metal sheet member making machine and a second position where the links are forced to move the rollers from the transverse direction to a longitudinal direction for enabling received finished corrugated metal sheet members to fall to a bottom place below the elongated rack.

DETAILED DESCRIPTION OF THE INVENTION

Figure 1:
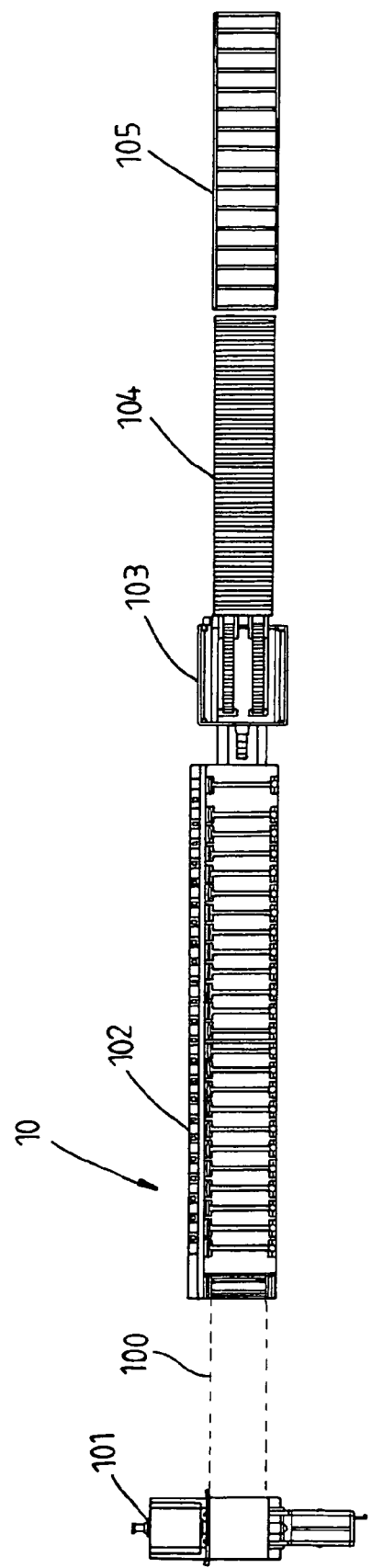
FIG. 1 is a top plain view of a corrugated metal sheet member making machine according to the prior art.
Figure 2:
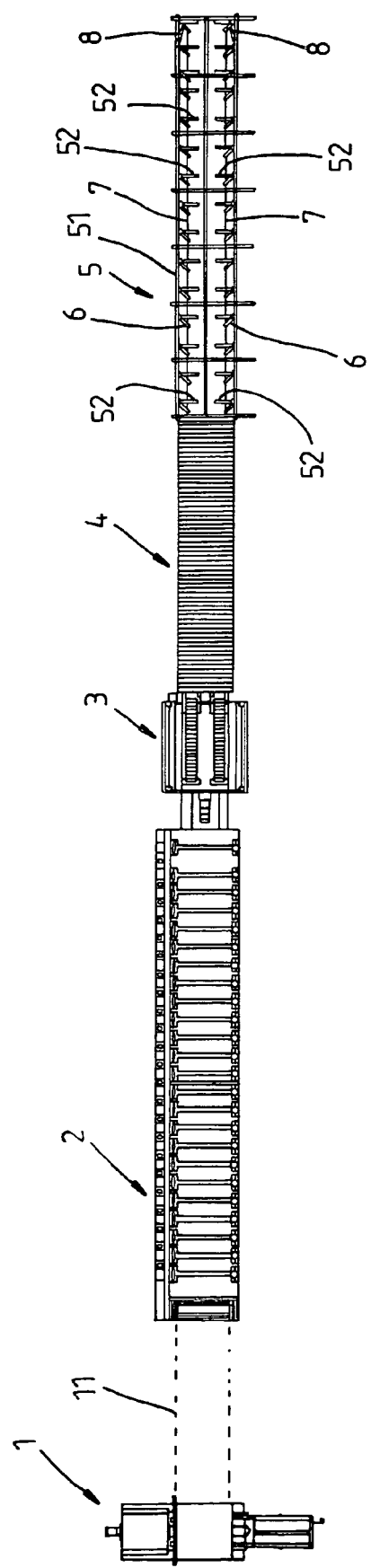
FIG. 2 is a top plain view of a corrugated metal sheet member making machine according to the present invention.
Figure 3:
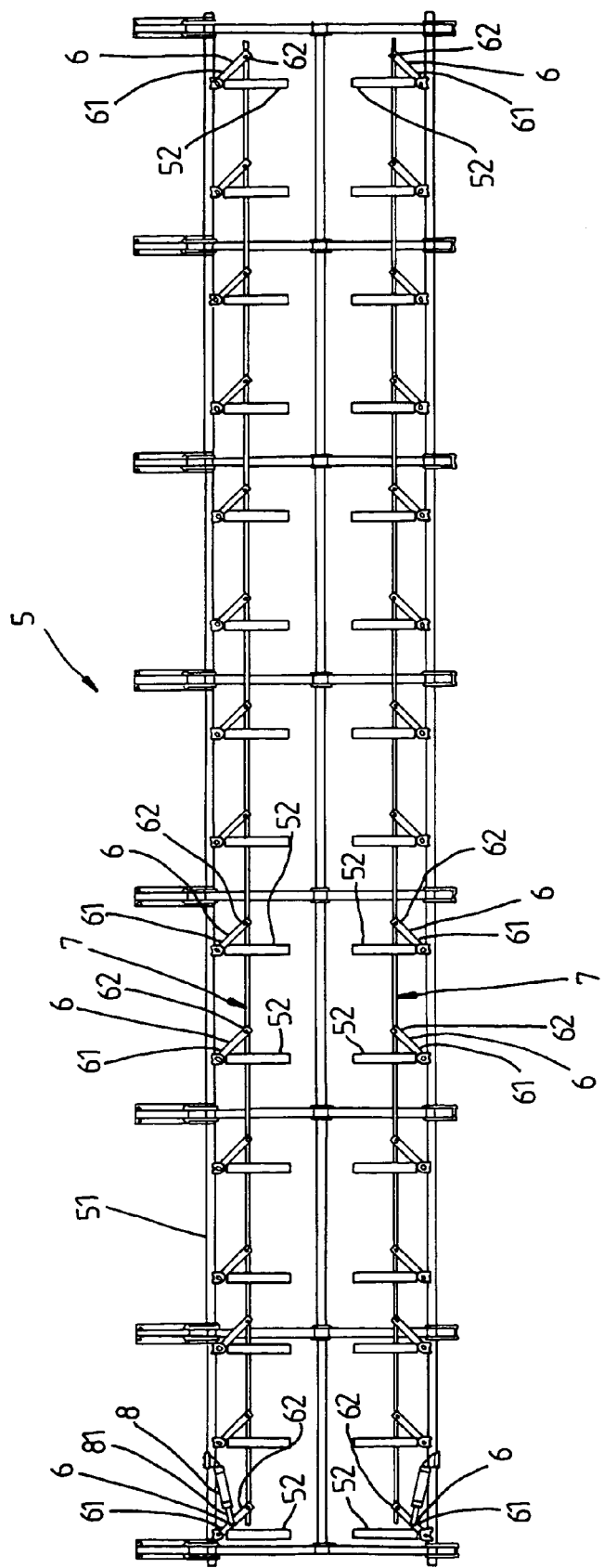
FIG. 3 is a top view in an enlarged scale of the finished product receiving unit used in the corrugated metal sheet member making machine according to the present invention.
Figure 4:
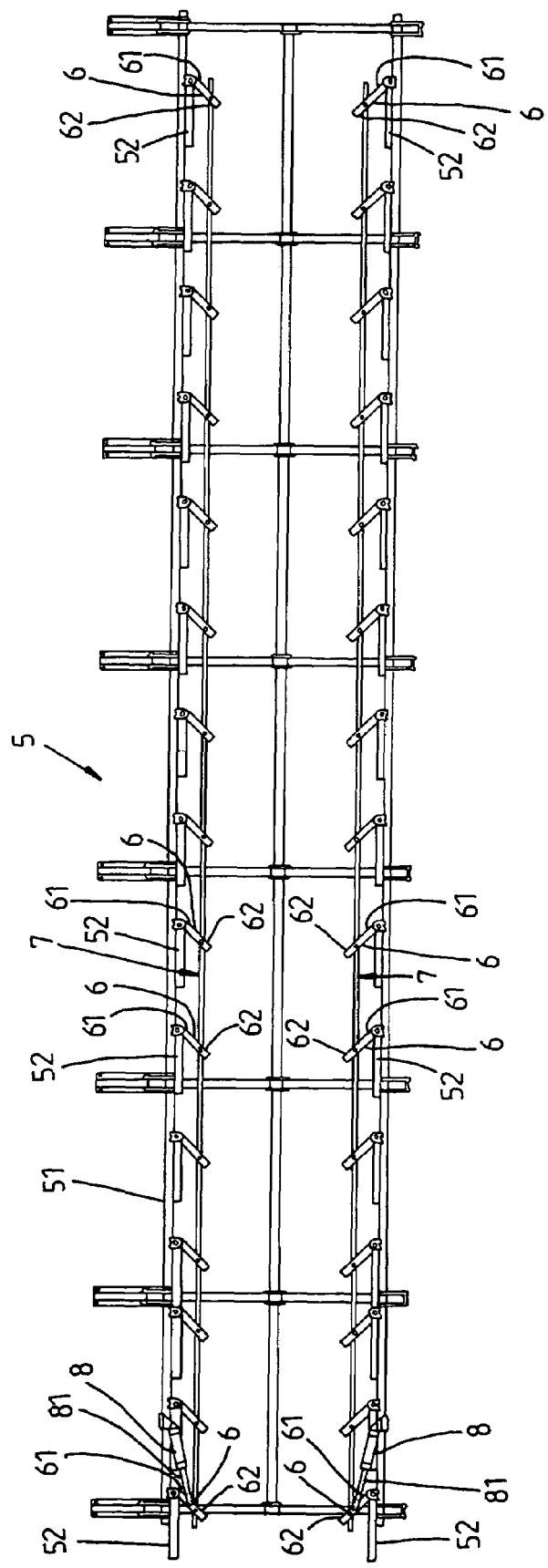
FIG. 4 is similar to FIG. 3 but showing the drag rods moved in one direction, the rollers turned to longitudinal direction.

Referring to FIGS. 2–5, a corrugated metal sheet member making machine in accordance with the present invention is shown comprised of a material feeder 1, a roller ramming unit 2, a cutting unit 3, a longitudinal conveyer 4, and a finished product receiving unit 5. Metal sheet material 11 is delivered from the material feeder 1 to the roller ramming unit 2 and roller-rammed into a corrugated form by the roller ramming unit 2, and then the corrugated metal sheet material is properly cut by the cutting unit 3 into corrugated metal sheet members subject to the desired size, and then the finished products are delivered one after another to the finished product receiving unit 5 by the longitudinal conveyer 4.

The finished product receiving unit 5 comprises an elongated rack 51 extended in longitudinal direction, a plurality of rollers 52 symmetrically bilaterally arranged at the top and along the length of the elongated rack 51, two drag rods 7 longitudinally arranged in parallel inside the elongated rack 51, a plurality of links 6 symmetrically arranged at two sides in the elongated rack 51 corresponding to the rollers 52, and two air cylinders 8 bilaterally installed in the elongated rack 51 at the top. The links 6 each have one end 61 coupled to one end of one of the rollers 52 and the other end 62 coupled to one of the drag rods 7. The air cylinders 8 have the respective piston rods 81 respectively coupled to the drag rods 7. The air cylinders 8 are controlled to move the piston rods 81 between the extended position and the received position. When the piston rods 81 of the air cylinders 8 are extended out, the drag rods 7 are longitudinally moved in one direction to push the links 6 and the rollers 52, and therefore the rollers 52 are turned to a longitudinal direction and respectively closely attached to the two opposite long sides of the elongated rack 51 to release the received finished products, enabling the received finished products to fall to the bottom side of the elongated rack 51 (see FIG. 4). On the contrary, when the piston rods 81 of the air cylinders 8 are received, the drag rods 7 are forced to reverse the links 6 and the rollers 52, and therefore the rollers 52 are turned from the aforesaid longitudinal direction to a transverse direction for supporting finished products delivered from the longitudinal conveyer 4 (see FIGS. 2 and 3).

Figure 5:
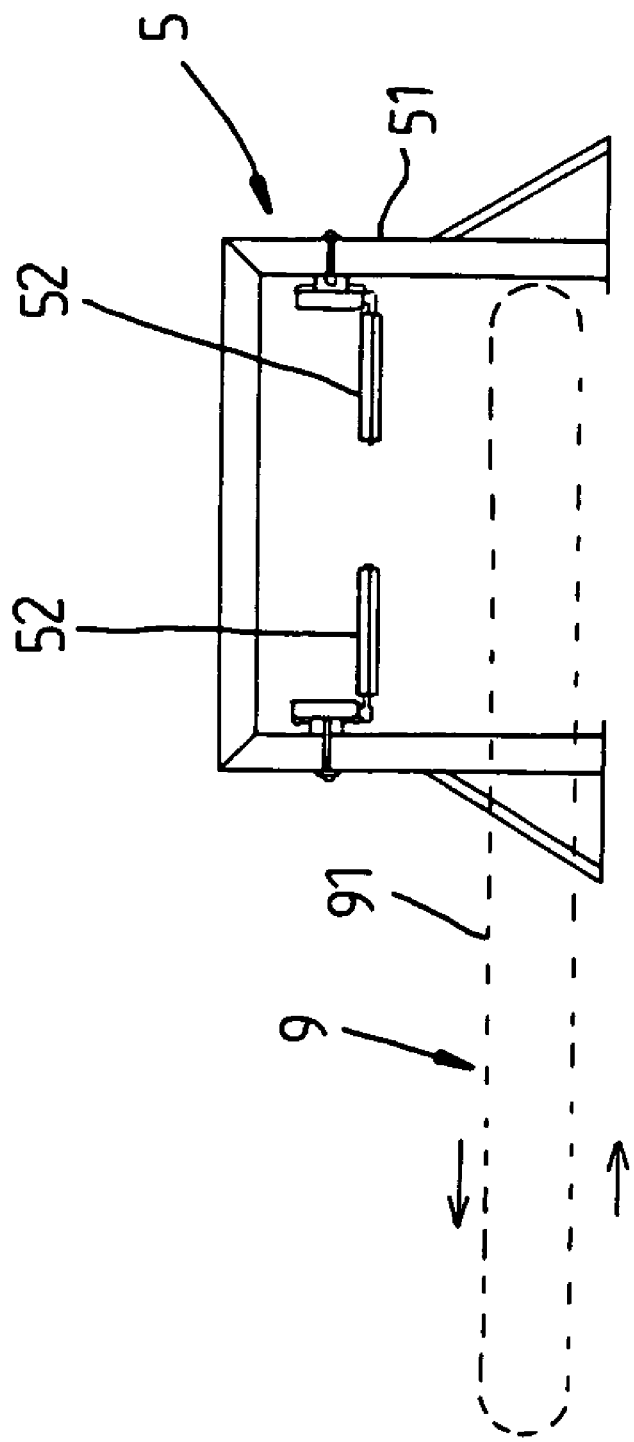
FIG. 5 is a schematic rear view showing a transverse conveyer provided at the bottom side of the elongated rack of the finished product receiving unit.

Referring to FIG. 5, a transverse conveyer 9 is provided at the bottom side of the elongated rack 51 of the finished product receiving unit 5, having a conveying table 91 for carrying finished products falling from the elongated rack 51 to the assigned place.

As indicated above, the design of the finished product receiving unit of the corrugated metal sheet member making machine greatly simplifies the collection and arrangement of finished products, thereby saving much labor and time.

While only one embodiment of the present invention has been shown and described, it will be understood that various modifications and changes could be made thereunto without departing from the spirit and scope of the invention disclosed.

What is claimed is:

1. A finished product receiving unit used in a corrugated metal sheet member making machine for receiving finished corrugated metal sheet members, comprising:
    an elongated rack;
    a plurality of rollers arranged in pairs along a length of said elongated rack;
    two drag rods arranged in parallel inside said elongated rack;
    a plurality of links arranged on two sides inside said elongated rack corresponding to the rollers, said links each having a first end coupled to one end of one of said rollers and a second end coupled to one of said drag rods; and
    two air cylinders installed in said elongated rack and adapted to move said drag rods between a first position where said links are forced to move said rollers to a first position supporting the finished corrugate metal sheet members received from said corrugated metal sheet member making machine and a second position where said links are forced to move said rollers from said first position to a second position enabling the finished corrugated metal sheet members to fall to a bottom place below said elongated rack.

2. The finished product receiving unit as claimed in claim 1, further comprising a transverse conveyer provided below said elongated rack, said transverse conveyer comprising a conveying table for conveying finished products falling from said rollers to an assigned place.

* * * * *